(12) United States Patent
Tanaka

(10) Patent No.: US 11,126,883 B2
(45) Date of Patent: Sep. 21, 2021

(54) CHARACTER STRING RECOGNITION APPARATUS, AND NON-TRANSITORY COMPUTER READABLE MEDIUM

(71) Applicant: FUJIFILM Business Innovation Corp., Tokyo (JP)

(72) Inventor: Eiichi Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/365,688

(22) Filed: Mar. 27, 2019

(65) Prior Publication Data

US 2020/0097750 A1  Mar. 26, 2020

(30) Foreign Application Priority Data

Sep. 21, 2018  (JP) .............................. JP2018-177565

(51) Int. Cl.
*G06K 9/34* (2006.01)
*G06N 3/08* (2006.01)
*G06K 9/46* (2006.01)

(52) U.S. Cl.
CPC ........... *G06K 9/344* (2013.01); *G06K 9/4604* (2013.01); *G06N 3/08* (2013.01); *G06K 2209/01* (2013.01)

(58) Field of Classification Search
CPC .. G06K 9/344; G06K 9/4604; G06K 2209/01; G06K 7/14; G06K 2209/011; G06K 9/00785; G06F 16/5846; G06F 16/7844; G06N 3/08
See application file for complete search history.

(56) References Cited

U.S. PATENT DOCUMENTS

| 5,418,862 | A | * | 5/1995 | Zheng | .................. G06K 7/1092 235/462.1 |
| 5,880,451 | A | * | 3/1999 | Smith | ...................... G06K 7/14 235/462.1 |
| 2001/0021261 | A1 | * | 9/2001 | Koga | .................. G06K 9/00469 382/101 |
| 2006/0008148 | A1 | * | 1/2006 | Mochizuki | ............. G06K 9/348 382/182 |
| 2008/0040111 | A1 | * | 2/2008 | Miyamoto | .............. G10L 15/22 704/240 |

(Continued)

FOREIGN PATENT DOCUMENTS

| JP | H06-44409 | | 2/1994 |
| JP | 2013041535 A | * | 2/2013 |

OTHER PUBLICATIONS

Deep neural network with attention model for scene text recognition IET Computer Vision 2017 vol. 11 iss. 7 pp. 605-612.*

(Continued)

*Primary Examiner* — Jingge Wu
(74) *Attorney, Agent, or Firm* — JCIPRNET

(57) ABSTRACT

A character string recognition apparatus includes a prediction unit that computes an attention single character certainty factor from a single character certainty factor, computed for a sequence of a partial pattern of an input pattern that is a character string serving as a recognition target, and from attention information computed by a recurrent neural network. The prediction unit shares a parameter among labels serving as recognition results, and uses the attention single character certainty factor as a feature value.

20 Claims, 13 Drawing Sheets

(56) References Cited

U.S. PATENT DOCUMENTS

| | | | | |
|---|---|---|---|---|
| 2008/0177730 | A1* | 7/2008 | Endo | G06F 16/7844 |
| 2015/0146985 | A1* | 5/2015 | Nakasu | G06K 9/18 |
| | | | | 382/182 |
| 2015/0213332 | A1* | 7/2015 | Fujiwara | G06K 9/685 |
| | | | | 382/203 |
| 2016/0125275 | A1* | 5/2016 | Hamada | G06K 9/72 |
| | | | | 382/229 |
| 2016/0300119 | A1* | 10/2016 | Silva | G06F 16/2228 |
| 2017/0123492 | A1* | 5/2017 | Marggraff | H04N 5/247 |
| 2017/0244851 | A1* | 8/2017 | Oya | G06K 9/00463 |
| 2017/0262722 | A1* | 9/2017 | Nanaumi | G06K 9/344 |
| 2019/0182397 | A1* | 6/2019 | Ogawa | H04N 1/00822 |
| 2019/0230233 | A1* | 7/2019 | Oya | G06K 9/00463 |

OTHER PUBLICATIONS

Masanori Sekino et al., "Improvement of Convolutional Neural Network Character Recognition Based on Visual Information Processing Model," The 27th Annual Conference of the Japanese Society for Artificial Intelligence, Jun. 2013, pp. 1-4.

Ilya Sutskever et al., "Sequence to Sequence Learning with Neural Networks," Advances in neural information processing systems, Mar. 15, 2009, pp. 1-9.

Jeff Donahue et al., "DeCAF: A Deep Convolutional Activation Feature for Generic Visual Recognition," International conference on machine learning, Jan. 27, 2014, pp. 647-655.

Cho, Kyunghyun et al., "Learning phrase representations using RNN encoder-decoder for statistical machine translation," arXiv, 1406.1078, Jun. 3, 2014, pp. 1-15.

Bahdanau D et al., "Neural Machine Translation by Jointly Learning to Align and Translate," arXiv, 1409.0473, Sep. 1, 2014, pp. 1-15.

Chan, William et al., "Listen, attend and spell: A neural network for large vocabulary conversational speech recognition," 2016 IEEE International Conference on Acoustics, Speech and Signal Processing (ICASSP). IEEE, 2016, Mar. 20, 2016, pp. 4960-4964.

* cited by examiner

| | LABEL | 土 | 土 | 土 | 十 | ... | 巌 |
|---|---|---|---|---|---|---|---|
| | CERTAINTY FACTOR | 0.50 | 0.20 | 0.17 | 0.02 | ... | 0.00 |

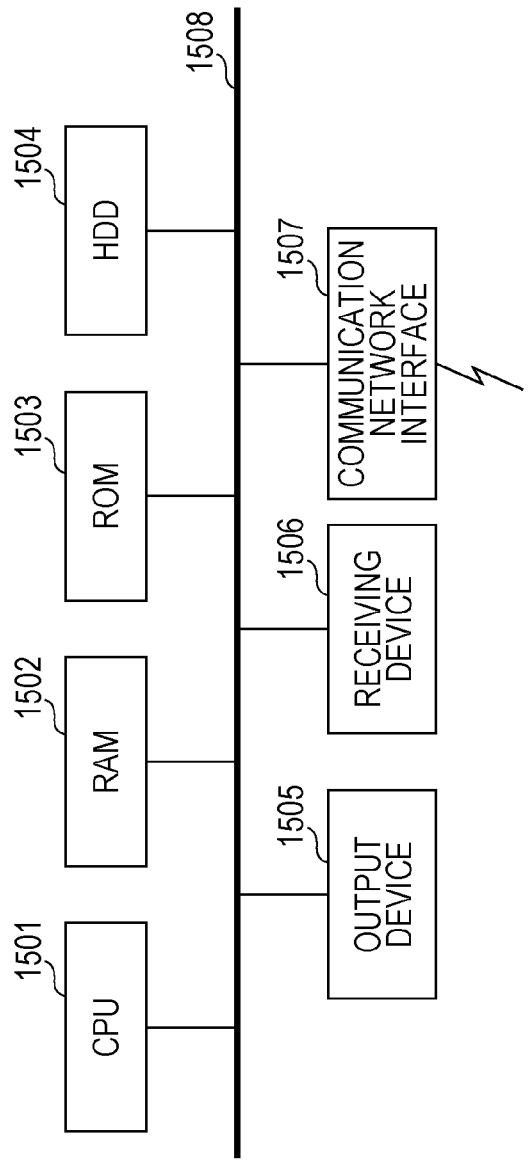

CHARACTER STRING RECOGNITION APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-177565 filed Sep. 21, 2018.

BACKGROUND

(i) Technical Field

The present disclosure relates to a character string recognition apparatus, and a non-transitory computer readable medium.

(ii) Related Art

Japanese Unexamined Patent Application Publication No. 06-044409 discloses a character recognizing apparatus. The character recognizing apparatus is directed to achieving smaller scale design, higher recognition speed, and higher recognition rate. The character recognizing apparatus includes a character input unit, a neural network, and a recognition result output unit. Each node forming the neural network has a feedback path. The neural network thus forms a recurrent neural network.

Machine learning techniques are disclosed by literature listed as follows: Masanori Sekino, Shunichi Kimura, and Yutaka Koshi, "Improvement of Convolutional Neural Network Character Recognition Based on Visual Information Processing Model" The Japanese Society for Artificial Intelligence (JSAI), 2013; Sutskever, Ilya, Oriol Vinyals, and Quoc V. Le, "Sequence to sequence learning with neural networks," Advances in neural information processing systems, 2014; Donahue, Jeff, et al. "DeCAF: A deep convolutional activation feature for generic visual recognition," International Conference on Machine Learning, 2014; Cho, Kyunghyun, et al., "Learning phrase representations using RNN encoder-decoder for statistical machine translation," arXiv preprint arXiv: 1406.1078 (2014); Bandanau, Dzmitry, Kyunghyun Cho, and Yoshua Bengio, "Neural machine translation by jointly learning to align and translate," arXiv preprint arXiv: 1409.0473 (2014); and Chan, William, et al., "Listen, attend and spell: A neural network for large vocabulary conversational speech recognition," Acoustics, Speech and Signal Processing (ICASSP), 2016 IEEE International Conference on, IEEE, 2016.

In typical character string recognition, a parameter is computed from learning data that includes a pair of an input image and an output label sequence (also referred to as character string). The accuracy of the character string recognition is largely dependent on the degree of frequency of a label included in the output label sequence. Specifically, better parameters are not learned in a label having a lower degree of frequency, and lower recognition accuracy results. A label not present in the learning data is not output. In a language having a larger number of characters, such as Japanese, labels are greater in number, existing character string data has a larger bias of the labels, and in particular, and there are a large number of labels with a very lower degree of frequency.

SUMMARY

Aspects of non-limiting embodiments of the present disclosure relate to a character string recognition apparatus that provides a higher accuracy level in character recognition than label-dependent character string recognition techniques.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a character string recognition apparatus. The character string recognition apparatus includes a prediction unit that computes an attention single character certainty factor from a single character certainty factor, computed for a sequence of a partial pattern of an input pattern that is a character string serving as a recognition target, and from attention information computed by a recurrent neural network. The prediction unit shares a parameter among labels serving as recognition results, and uses the attention single character certainty factor as a feature value.

BRIEF DESCRIPTION OF THE DRAWINGS

Exemplary embodiment of the present disclosure will be described in detail based on the following figures, wherein:

FIG. 15 is a block diagram illustrating a hardware configuration of a computer that implements the exemplary embodiment.

DETAILED DESCRIPTION

Figure 1:
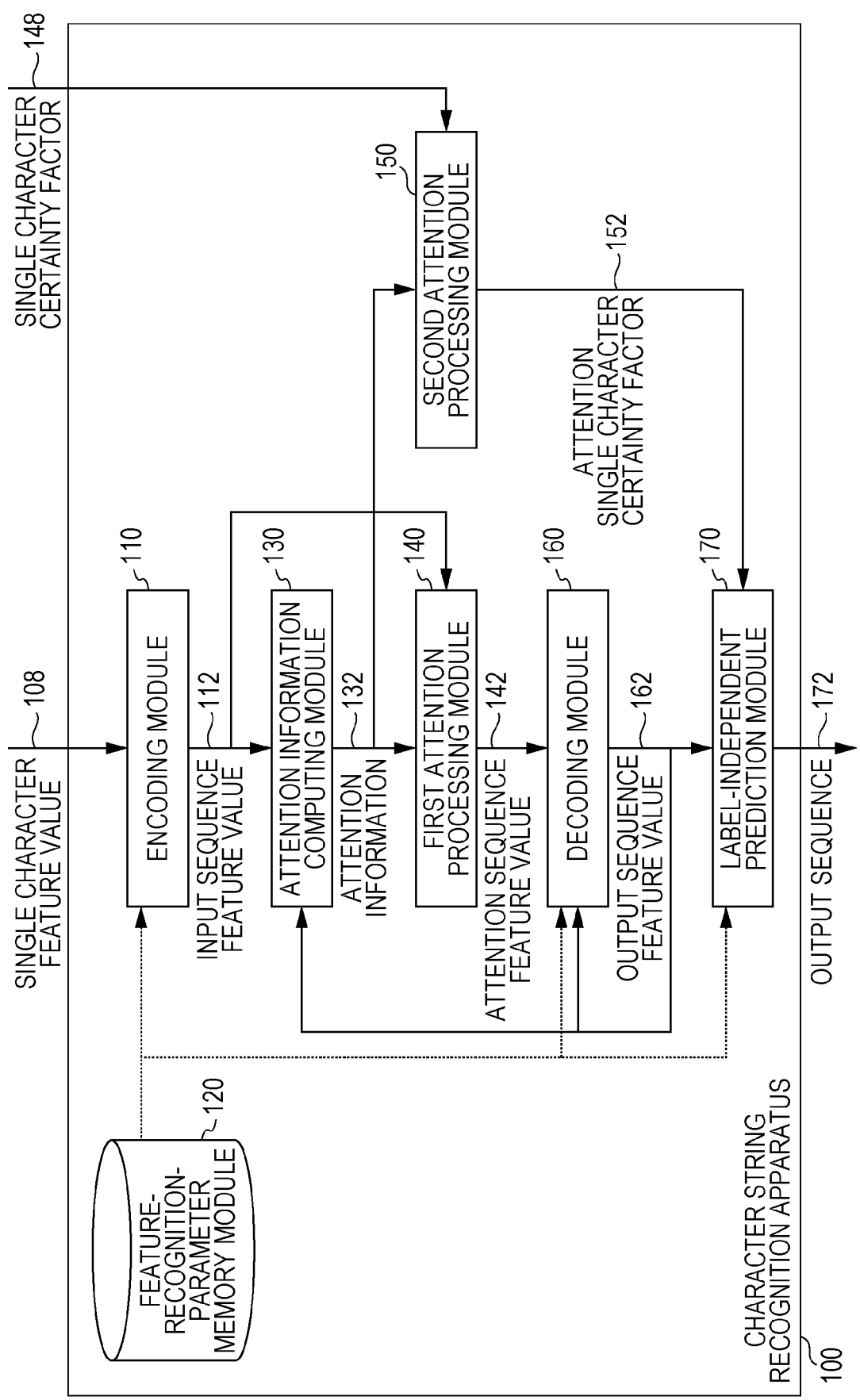
FIG. 1 illustrates a conceptual modular structure of a configuration of an exemplary embodiment.

The premise of an exemplary embodiment or a character string recognition apparatus that is based on the exemplary embodiment is described first in connection with FIGS. 2 through 8 before the discussion of the exemplary embodiment. The following discussion is intended to help understand the exemplary embodiment.

The term module refers to a software component that is logically separable (a computer program), or a hardware component. The module of the exemplary embodiment refers to not only a module in a computer program but also a module in a hardware configuration. The discussion of the exemplary embodiment also serves as the discussion of computer programs for causing the modules to function (including a program that causes a computer to execute each step, a program that causes the computer to function as an element, and a program that causes the computer to implement each function), a system and a method. In the discussion that follows, the phrases "stores information," "causes information to be stored," and other phrases equivalent thereto are used. If the exemplary embodiment is a computer program, these phrases are intended to express "causes a memory device to store information" or "controls a memory device to cause the memory device to store information." The modules may correspond to the functions in one-to-one correspondence. In software implementation, one module may be composed of one program or multiple modules may be composed of one program. One module may be composed of multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, a data reference relationship, or a login). The term "predetermined" means that something is decided in advance of a process of interest. The term "predetermined" is thus intended to refer to something that is decided in advance of a process of interest in the exemplary embodiment. Even after a process in the exemplary embodiment has started, the term "predetermined" refers to something that is decided in advance of a process of interest depending on a condition or a status of the exemplary embodiment at the present point of time or depending on a condition or status of the exemplary embodiment heretofore continuing down to the present point of time. If "predetermined values" are plural, the predetermined values may be different from each other, or two or more of the predetermined values (including all the values) may be equal to each other. A statement that "if A, B is to be performed" is intended to mean that it is determined whether something is A, and that if something is determined as A, an action B is to be taken. The statement becomes meaningless if the determination as to whether something is A is not performed. If things are listed, such as "A, B, and C", they are listed as examples unless otherwise particularly noted, including one this only (for example, only A) selected.

The term system and the term apparatus refer to an arrangement where multiple computers, hardware configurations, and apparatuses are interconnected via a communication network (including a one-to-one communication connection). The term system and the term apparatus also refer to an arrangement that includes a single computer, a hardware configuration, or an apparatus. The term "system" and the term "apparatus" have the same definition and are interchangeable with each other. The system in the context of the exemplary embodiment does not include a social system that is a social arrangement formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disk, a random-access memory (RAM), an external storage medium, a memory device connected via a communication network, and a register within a central processing unit (CPU).

Figure 2:
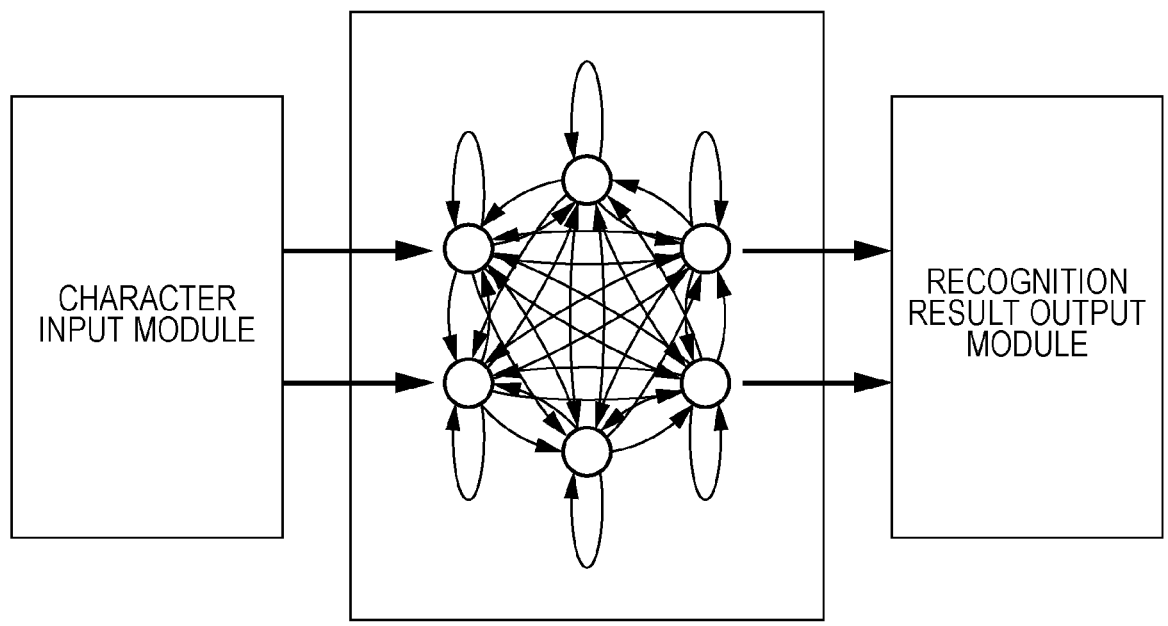
FIG. 2 illustrates an example of character recognition performed using a neural network.

FIG. 2 illustrates an example of character recognition performed using a neural network.

A character recognition apparatus includes a character input unit, a neural network, and a recognition result output unit. Each node forming the neural network has a feedback path. The character recognition apparatus thus forms a recurrent neural network (see Japanese Unexamined Patent Application Publication No. 06-044409).

An online character recognition apparatus using a neural network includes a character input unit that generates time-sequence data of a recognition target character. The neural network includes a neural cell element including a memory that stores an internal state value, an update unit that updates the internal state value in accordance with an input value from outside and the stored internal state value, and a generating unit that generates an output value to outside from the internal state value. The online character recognition apparatus uses the time-sequence data as an input to the neural network.

Figure 3A:
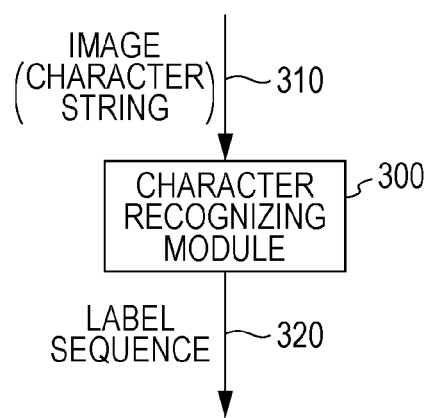
FIGS. 3A through 3C generally illustrate character string recognition.
Figure 3B:
Figure 3C:
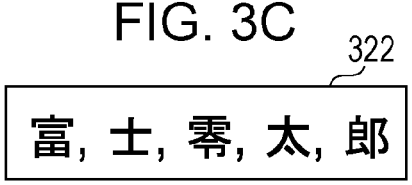

FIGS. 3A through 3C generally illustrates character string recognition. The character string recognition includes receiving a character string pattern (a character string image in the character image recognition or a character string stroke in online character recognition), and outputting a label sequence (a character code sequence) as a pronunciation of the character string. For simplicity of explanation, the input is a character string image in the following discussion. A character in the character string image is referred to as a single character. Referring to FIG. 3A, a character recognizing module 300 receives an image (character string) 310, and outputs a label sequence 320. Referring to FIG. 3B, the character recognizing module 300 receives an image (character string) 312 "富士 零太郎" (Japanese kanji characters), and outputs a label sequence 322 that is the character code sequence "富, 士, 零, 太, 郎" (note that symbols " and , are delimiters).

Figure 4A:
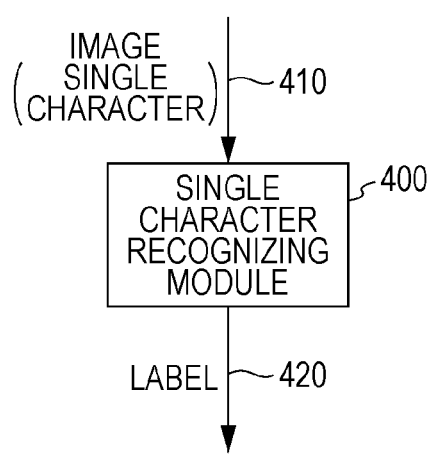
FIGS. 4A through 4C illustrate a recognition operation of a single character.
Figure 4B:
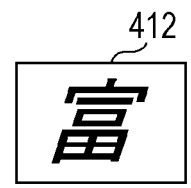
Figure 4C:

FIGS. 4A through 4C illustrate a recognition operation of a single character. Referring to FIG. 4A, a single character recognizing module 400 receives an image (single character) 410 and outputs a label sequence 420. For example, the character recognizing module 400 receives "富" as an image (single character) 412 as illustrated in FIG. 4B and outputs "富" as a label 422 that is a character code as illustrated in FIG. 4C.

The character string recognition is different from the recognition of a single character as illustrated in FIGS. 4A through 4C, and includes many unspecified characters in the input. The number of characters to be output are ambiguous (difficult to identify). The border between characters containing left and right kanji radicals in a language, such as Japanese, is ambiguous, and the region of each character to be recognized is difficult to identify. Each kanji is made up of different components, and basic components of the kanji are referred to as radicals. The use of highly accurate single character recognition alone is not sufficient to perform character recognition at a higher accuracy level.

Figure 5:
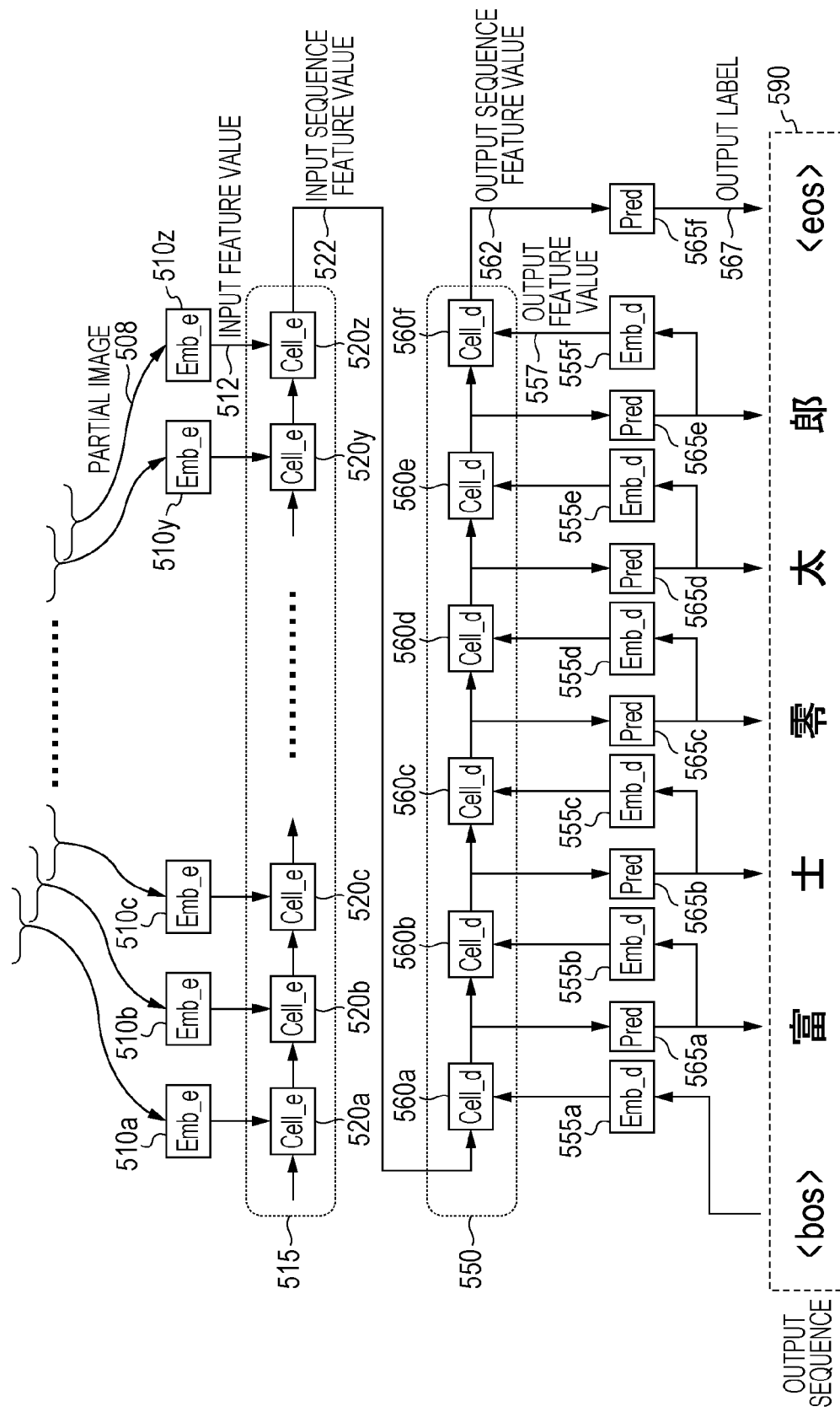
FIG. 5 illustrates an example of the character string recognition using a recurrent neural network (Seq2Seq model)

The character string recognition using the recurrent neural network (a sequence to sequence (Seq2Seq) model, for example) may be considered to be a solution. FIG. 5 illustrates the concept of the character string recognition. In the discussion that follows, the feature value is a numerical vector. (In the discussion that follows, the feature value is a numerical vector having a fixed length, but may be a numerical vector having a variable length.)

A module emb_e 510 performs a feature value extraction process, namely, computes an input feature value 512 from a partial image 508 of an image (character string) 312 that is an input character string image. The partial image 508 is a partial region that is extracted by successively moving a region of a fixed size along the image (character string) 312 in a character string direction.

Figure 6:
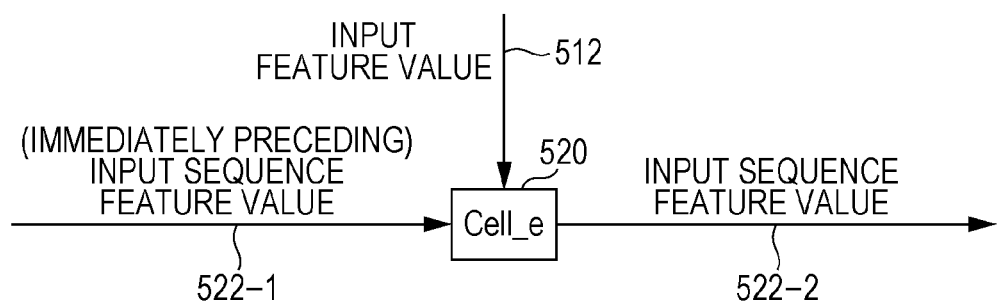
FIG. 6 illustrates a process example of a minimum processing unit of a recurrent process performed by an encoding module.

An encoding module 515 computes an input sequence feature value 522 from an input feature value 512. The encoding module 515 performs a recurrent process, based on a module cell_e 520 as a unit. Referring to FIG. 5, the cell_e 520 (such as the module cell_e 520a) is common module. Each module cell_e 520 receives the corresponding input feature value 512 and the output (an input sequence feature value 522) from the module cell_e 520 at the stage immediately prior to the cell_e 520, and computes the succeeding input sequence feature value 522. This operation is illustrated in FIG. 6. FIG. 6 illustrates an example of an operation of a minimum unit of the recurrent process of the encoding module 515. The module cell_e 520 receives the input feature value 512 and an (immediately preceding) input sequence feature value 522-1, and outputs an input sequence feature value 522-2. The module cell_e 520 receives the input sequence feature value 522-2 as the (immediately preceding) the input sequence feature value 522-1, and then outputs the next input sequence feature value 522-2. This operation continues until the operation reaches the final partial image 508 in the image (character string) 312.

The use of the past information in this way permits more accurate recognition that accounts for the information on the other partial images 508. The initial input to the module cell_e 520 in the recurrent process is a numerical vector that has the same size as the input sequence feature value and is initialized with zero or the like. The module cell_e 520 (or cell_d 560 described below) may be the one disclosed in Long Short Term Memory (LSTM) (see Sutskever, Ilya, Oriol Vinyals, and Quoc V. Le, "Sequence to sequence learning with neural networks," Advances in neural information processing systems, 2014)) and in Gated Recurrent Unit (GRU) (see Cho, Kyunghyun, et al., "Learning phrase representations using RNN encoder-decoder for statistical machine translation," arXiv preprint arXiv: 1406.1078 (2014)).

A decoding module 550 computes an output sequence feature value 562 from the input sequence feature value 522 computed last by the encoding module 515 (the module cell_e 520). The decoding module 550 performs the recurrent process as the encoding module 515 does. The module cell_d 560 (including the module cell_d 560a) are all identical to each other as illustrated in FIG. 5. The module cell_d 560 outputs a next output sequence feature value 562 from an corresponding output feature value 557 and the output sequence feature value 562. A module pred 565 outputs an output label 567, based on the corresponding output sequence feature value 562. The modules preds_565 (including the module pred 565a) are all identical to each other as illustrated in FIG. 5. A module emb_d 555 computes the output feature value 557 from the immediately preceding output label 567. The modules emb_d 555 (including the emb_d 555a) of FIG. 5 are identical to each other. Since there is not any immediately preceding output label 567 at the front end of an output sequence 590, a starting label <bos> (beginning of strings) is set. The recurrent process of the decoding module 550 stops when an ending label <eos> (end of strings) is output.

The Seq2Seq model includes all elements in a neural network. In this way, parameter learning of the entire Seq2Seq model is performed through error back propagation method. (The module emb_e 510 may not necessarily be a neural network, and in such a case, a parameter of the module emb_e 510 is not a learning target.) In the character string recognition through the Seq2Seq model, an appropriate parameter for each of the elements may be automatically computed using as learning data a pair of an input image and a label sequence as an output responsive to the input image. A problem that the number of characters to be output is unknown and a problem that the border between the single characters is ambiguous are addressed and the character string recognition with a higher accuracy level thus may result.

Figure 7:
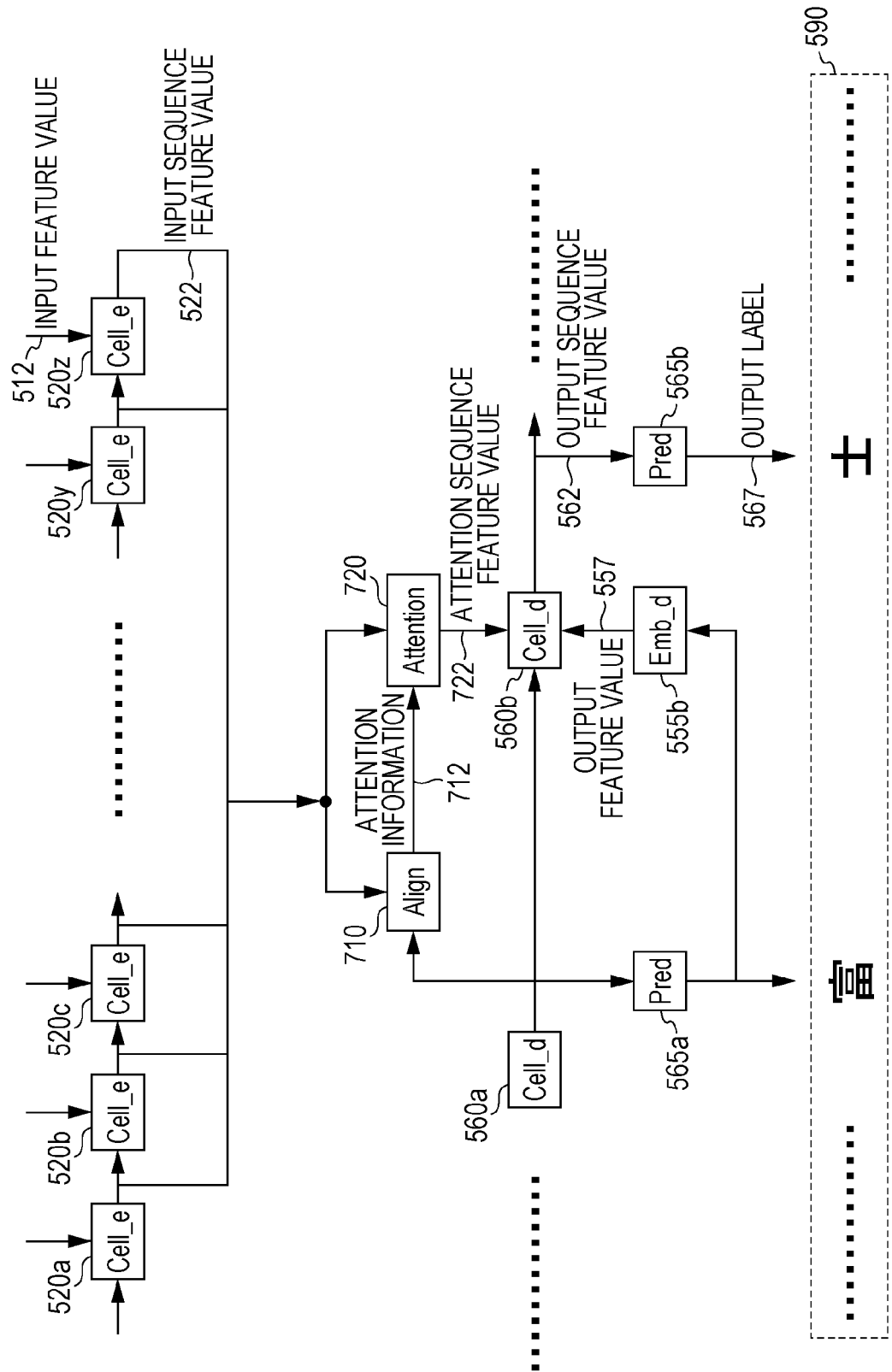
FIG. 7 generally illustrates character string recognition using an attention technique.

An attention technique is available to increase the accuracy level of the character string recognition through the Seq2Seq model (see Bandanau, Dzmitry, Kyunghyun Cho, and Yoshua Bengio, "Neural machine translation by jointly learning to align and translate," arXiv preprint arXiv: 1409.0473 (2014)). If the image (character string) 312 is relatively larger in size or the output sequence 590 is relatively longer in sequence length, the Seq2Seq model of FIG. 5 may have difficulty in embedding sufficient information in the input feature value 512 that is to be transferred to the decoding module 550. The attention technique selectively extracts an input sequence feature value to which attention is to be paid in order to compute a given label, and sets the extracted feature value to be an output feature value of a decoding unit. The problems may thus be addressed. FIG. 7 illustrates how the attention technique is used.

Figure 8:
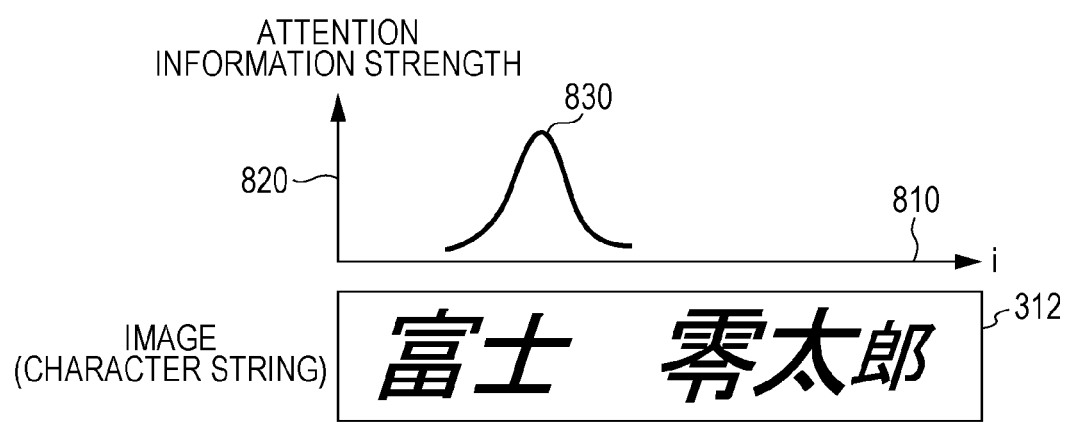
FIG. 8 illustrates an example of attention information.

In the same way as illustrated in FIG. 5, the encoding module 515 (the module cell_e 520) computes the input sequence feature value 522. From all the input sequence feature values 522 and the immediately preceding output sequence feature value 562, a module align 710 in the decoding module 550 computes attention information 712 to which attention is to be paid to output a succeeding output label 567. FIG. 8 illustrates an example of the attention information 712. A horizontal axis 810 represents an i-th input sequence feature value 522 in the image (character string) 312, and a vertical axis 820 represents the strength of the attention information. A graph 830 of attention information represents the attention information 712 for a j-th output sequence label. In other words, the attention information 830 is a vector having an element corresponding to how much of the i-th input sequence feature value is used to compute the j-th output sequence label.

A module attention 720 computes the attention sequence feature value 722 as a linear combination of the attention information 712 and the input sequence feature value 522. Based on a feature value that is obtained by combining the immediately preceding output sequence feature vector 562, the output feature value 557 computed from the immediately preceding output label 567, and the attention sequence feature value 722, the module cell_d 560b computes the succeeding output sequence feature value 562. Since the modules align 710 and attention 720 are a neural network in the same way as in FIG. 5, the parameter learning of the Seq2Seq model is possible when the attention technique is used.

Japanese Unexamined Patent Application Publication No. 06-044409 discloses the attention process using the recurrent neural network. The disclosed attention process does not use the Seq2Seq model and the training of a prediction unit is not performed. The disclosed attention process involves using information related to a border between characters in learning.

The character sequence recognition through the Seq2Seq model illustrated in FIGS. 5 and 7 computes a parameter from the learning data that is a pair of the input image and the output label sequence. The accuracy of the character sequence recognition is largely dependent on the degree of frequency of the label included in the output label sequence. Specifically, a good parameter is less likely to be learned with a label having a lower degree of frequency, and a lower recognition accuracy may result. Similarly, the label not present in the learning data is not output. Particularly, in a language having a larger number of types of characters, such as Japanese, the number of labels is large, and the existing character string data has a deviation in label. There are many labels that have a much smaller degree of frequency.

The exemplary embodiment performs the following process.

(1) A numerical vector representing the degree of possibility that an image is a label of an output candidate is computed for a partial image. The numerical vector is hereinafter also referred to as a single character certainty factor.

(2) A value for extracting a single character certainty is computed with respect to an input feature value direction using the attention information. The value is hereinafter also referred to as an attention single character certainty factor.

(3) A label is computed with a prediction unit that shares a parameter between the attention single character certainty factor and the label.

Figures 9, 10:
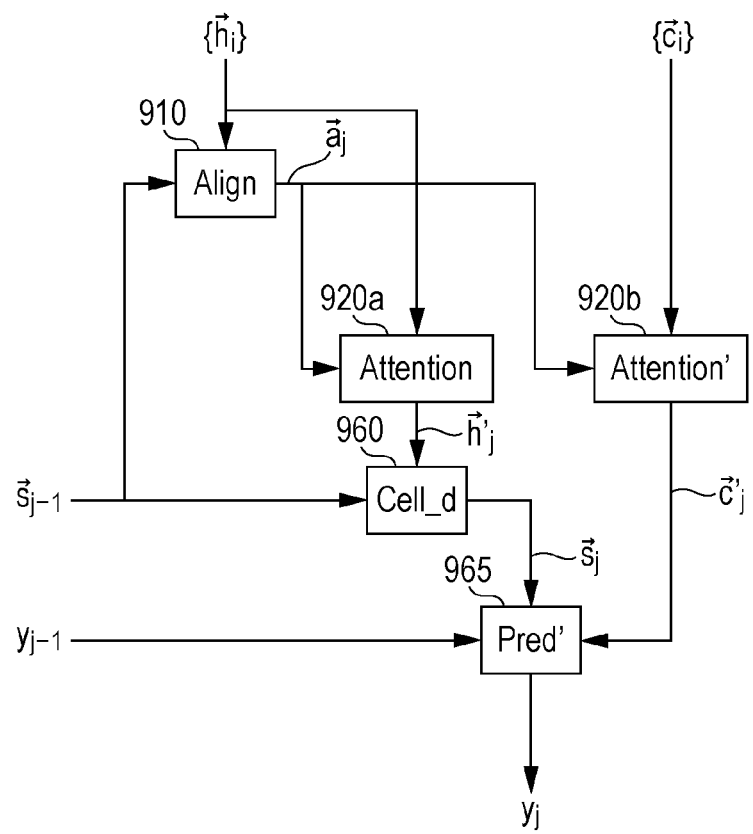
FIG. 9 illustrates a conceptual modular structure of a central configuration of the exemplary embodiment.
FIG. 10 illustrates an example of a single character certainty factor.

An exemplary embodiment of the disclosure is described below in connection with the drawings. FIG. 9 illustrates a conceptual modular structure of a central configuration of the exemplary embodiment of the disclosure. A module align 910 corresponds to the module align 710 of FIG. 7. Modules attention 920a and attention' 920b correspond to the module attention 720 of FIG. 7. A module cell_d 960 corresponds to the module cell_d 560 of FIG. 7. A module pred' 965 corresponds to the module pred 565 of FIG. 7.

FIG. 9 illustrates a recurrent process of a decoding module (the decoding module 160 of FIG. 1) in which a label is extracted. The meaning of each symbols illustrated in FIG. 9 is listed in the following table.

TABLE

| | |
|---|---|
| $\vec{a}_j$ | Attention information related to j-th output label |
| $\{\vec{h}_i\}$ | (Set of) all input sequence feature values |
| $\{\vec{c}_i\}$ | (Set of) all single character certainty factors |
| $\vec{h}_j'$ | Attention input sequence feature value for j-th output label |
| $\vec{c}_j'$ | Attention single character feature value for j-th output label |
| $\vec{s}_j$ | Output sequence feature value for j-th output label |
| $y_j$ | j-th output label |

According to the exemplary embodiment, the single character certainty factor output from a single character recognition device is used. The single character certainty factor is like a single character certainty factor 1000 of FIG. 10, and is a numerical vector representing the degree of possibility that the input image (a single character input image serving as a partial image) is the label of the input image. Specifically, the single character certainty factor is a pair of a label 1010 and a certainty factor 1020. Referring to FIG. 10, for example, a label " 士 " (kanji character pronounced "samu-rai") is a certainty factor of 0.50, a label " 土 " (kanji character meaning soil and pronounced "tsuchi") has a certainty factor of 0.20, and a label of "±" (plus and minus symbol) has a certainty factor of 0.02, and a label " 厳 " (kanji character meaning severe and pronounced "gen") has a certainty factor of 0.00.

The single character certainty factor is first computed for the partial image with the input feature value computed. The module attention' 920b computes the attention single character certainty factor using the attention information in a way similar to the way the attention sequence character certainty factor is computed. The module pred' 965 outputs a succeeding label from the immediately preceding label, the output sequence feature value, and the attention single character certainty factor. The probability $P(y_j|y_{j-1})$ with the label satisfying the condition that the label has been learned may be used for the immediately preceding label. The immediately preceding label does not necessarily have to be used. While the module pred 565 of FIGS. 5 and 7 has a parameter different from label to label, the module pred' 965 of the exemplary embodiment shares a single parameter among the labels, and thus provides label-independent prediction. If a single parameter is shared among the labels, a single assessment value is obtained from a single feature value. The recognition is difficult to perform. The module pred' 965 of the exemplary embodiment inputs the feature value on a per label basis, computes an assessment value on a per label basis, and outputs a maximum label as a recognition result. (If the assessment value indicates the likelihood of a correct solution, a maximum label is used, and if the assessment value indicates an error, a minimum label is used). Specifically, the feature value different from label to label is generated from the attention single character certainty factor of each label.

The use of a single character recognition device permits a parameter to be shared among the labels using. The exemplary embodiment is thus free from the problem that the accuracy level of the character string recognition via the Seq2Seq model is dependent on the degree of frequency of the label in the learning data. At the same time, by computing the attention single character certainty factor, the exemplary embodiment maintains the merit of the character string recognition via the Seq2Seq model, namely, a parameter learning function that addresses the problem that the number of characters to be output and the border between the characters are ambiguous.

FIG. 1 illustrates the conceptual modular structure of the configuration of the exemplary embodiment. The character string recognition apparatus 100 of the exemplary embodiment has a recognition function of a character string. As illustrated in FIG. 1, the character string recognition apparatus 100 includes an encoding module 110, a sequence-recognition-parameter memory module 120, an attention information computing module 130, a first attention processing module 140, a second attention processing module 150, a decoding module 160, and a level-independent prediction module 170. As described above, the character string recognition apparatus 100 is entirely configured to be a recurrent neural network, such as the Seq2Seq model.

The encoding module 110 is connected to the sequence-recognition-parameter memory module 120, the attention information computing module 130, and the first attention processing module 140. The encoding module 110 receives a single character feature value 108 and transfers an input sequence feature value 112 to the attention information computing module 130. The encoding module 110 receives the single character feature value 108 that is a sequence of a single character feature value that is computed for a partial pattern of an input pattern.

The sequence-recognition-parameter memory module 120 is connected to the encoding module 110, the decoding module 160, and the level-independent prediction module 170.

The attention information computing module 130 is connected to the encoding module 110, the first attention processing module 140, the second attention processing module 150, and the decoding module 160. The attention information computing module 130 receives the input sequence feature value 112 from the encoding module 110, and transfers attention information 132 to the first attention processing module 140 and the second attention processing module 150.

The first attention processing module 140 is connected to the encoding module 110, the attention information computing module 130, and the decoding module 160. The first attention processing module 140 receives the attention information 132 from the attention information computing module 130, and transfers an attention sequence feature value 142 to the decoding module 160.

The second attention processing module 150 is connected to the attention information computing module 130, and the level-independent prediction module 170. The second attention processing module 150 receives a single character certainty factor 148, receives the attention information 132 from the attention information computing module 130, and transfers an attention single character certainty factor 152 to the level-independent prediction module 170. The second attention processing module 150 computes the attention single character certainty factor 152 from the single character certainty factor 148 that is computed for the sequence of the partial pattern of the input pattern serving as a recognition target of a character string, and from the attention information 132 that is computed by the attention information computing module 130 serving as a recurrent neural network. The "partial pattern" includes a character and a border thereof (an image in character image recognition, or a vector column in online character recognition).

Non-character information indicating a non-character is added to the feature value used by the level-independent prediction module 170 by adding a non-character value to the attention single character certainty factor 152. The non-character information thus indicates that from among the feature values, a feature value that quotes an attention certainty factor for a non-character is non-character. Available as the non-character information are the beginning label <bos> and the ending label <eos>.

It will be noted that the second attention processing module 150 computes the attention single character certainty factor from the single character certainty factor.

The decoding module 160 is connected to the sequence-recognition-parameter memory module 120, the attention information computing module 130, the first attention processing module 140, and the level-independent prediction module 170. The decoding module 160 receives an attention sequence feature value 142 from the first attention processing module 140, and transfers an output sequence feature value 162 to the level-independent prediction module 170.

The level-independent prediction module 170 is connected to the sequence-recognition-parameter memory module 120, the second attention processing module 150, and the decoding module 160. The level-independent prediction module 170 receives the attention single character certainty factor 152 from the second attention processing module 150, receives the output sequence feature value 162 from the decoding module 160, and outputs an output sequence 172. The level-independent prediction module 170 shares a parameter among recognition results, and then outputs the output sequence 172. In such a case, the level-independent prediction module 170 uses the attention single character certainty factor 152 as one of the feature values.

The single character feature value 108 is the input feature value 512 of FIGS. 5 and 7, and is computed in advance. The single character certainty factor 148 is also computed in advance. When the neural networks are trained, the single character feature value 108 and the single character certainty factor 148 may be fixed. It is natural that these feature values are computed in advance.

The encoding module 110 computes the input sequence feature value 112 in accordance with Equation 1:

$$\vec{h}_i = \text{Cell}_e(\vec{h}_{i-1}, \vec{g}_i) \qquad \text{Equation 1}$$

where vector $h_i$ is an i-th input sequence feature value 112 and vector $g_i$ is an i-th single character feature value 108. The module $\text{cell}_e$ may be LSTM, GRU or the like and may have a parameter that is included in sequence recognition parameters and is to be learned.

The encoding module 110 may be the unidirectional recurrent neural network of FIG. 5, or a bidirectional RNN (see Bandanau, Dzmitry, Kyunghyun Cho, and Yoshua Bengio, "Neural machine translation by jointly learning to align and translate," arXiv preprint arXiv: 1409.0473 (2014)), or a stacked-type pyramidal RNN (see Chan, William, et al., "Listen, attend and spell: A neural network for large vocabulary conversational speech recognition," Acoustics, Speech and Signal Processing (ICASSP), 2016 IEEE International Conference on, IEEE, 2016). The use of past information in this way enables higher accuracy recognition that accounts for information of another partial image.

The attention information computing module 130 computes the attention information 132 in accordance with Equations 2:

$$\epsilon_{ij} = \vec{V}_\epsilon \tanh(W_h \vec{h}_i + W_s \vec{s}_j) \qquad \text{Equations 2}$$

$$a_{ij} = \frac{\exp\{\epsilon_{ij}\}}{\sum_{i'} \exp\{\epsilon_{i'j}\}}$$

This process corresponds to the module align 910 of FIG. 9. Vectors $V_E$, $W_h$, and $W_s$ are parameters to be learned, and are included in sequence recognition parameters. $a_{ij}$ are an i-th element of a vector $a_j$ that is attention information. A vector $s_j$ is a j-th output sequence feature value. The configuration of the neural network enables the extraction of the attention information to be learned, and an attention process applicable to a target is thus implemented.

The first attention processing module 140 computes the attention sequence feature value 142 in accordance with Equation 3:

$$\vec{h}'_j = \sum_i a_{ij} \vec{h}_i \qquad \text{Equation 3}$$

This process corresponds to the module attention 920a of FIG. 9. Similarly, the second attention processing module 150 computes the output sequence feature value 162 in accordance with Equation 4:

$$\vec{c}'_j = \sum_i a_{ij} \vec{c}_i \qquad \text{Equation 4}$$

This process corresponds to the module attention' 920b of FIG. 9.

The decoding module 160 computes the output sequence feature value 162 in accordance with Equation 5:

$$\vec{s}_j = \text{Cell}_d(\vec{s}_{j-1}, \vec{h}_j) \qquad \text{Equation 5}$$

The module cell$_d$ may be LSTM, GRU, or the like and may have a parameter that is to be learned and included in sequence recognition parameters.

Finally, the level-independent prediction module 170 computes a label, thereby resulting in the output sequence 172. This process corresponds to the module pred' 965 of FIG. 9. Specifically, the label is computed in accordance with Equations 6:

$$y_j = \text{argmax}_k \{e_{jk}\} \qquad \text{Equations 6}$$

$$e_{jk} = \vec{V}_e \sigma(W_f \vec{f}_{jk} + b)$$

$$c''_{jk} = \begin{cases} 0 & \text{... if } k \text{ is non-character} \\ c'_{jk} & \text{... otherwise} \end{cases}$$

$$f_{jk} = \text{concat}(c''_{jk}, \vec{s}_j)$$

It will be noted that vectors $V_e$, $W_f$, and b are parameters to be learned and are included in the sequence recognition parameters. As previously described, these parameters are shared among the labels. k represents a label, and $c'_{jk}$ represents the value of the label k of a j-th attention single character certainty factor 152. σ represents a function that returns a vector obtained as a result of applying the sigmoid function to each element of an input vector. c"jk represents a single character certainty factor that includes an added non-character value, and does not necessarily have to be zero, but padding for matrix calculation. concat represents a function that links vectors.

Figure 11:
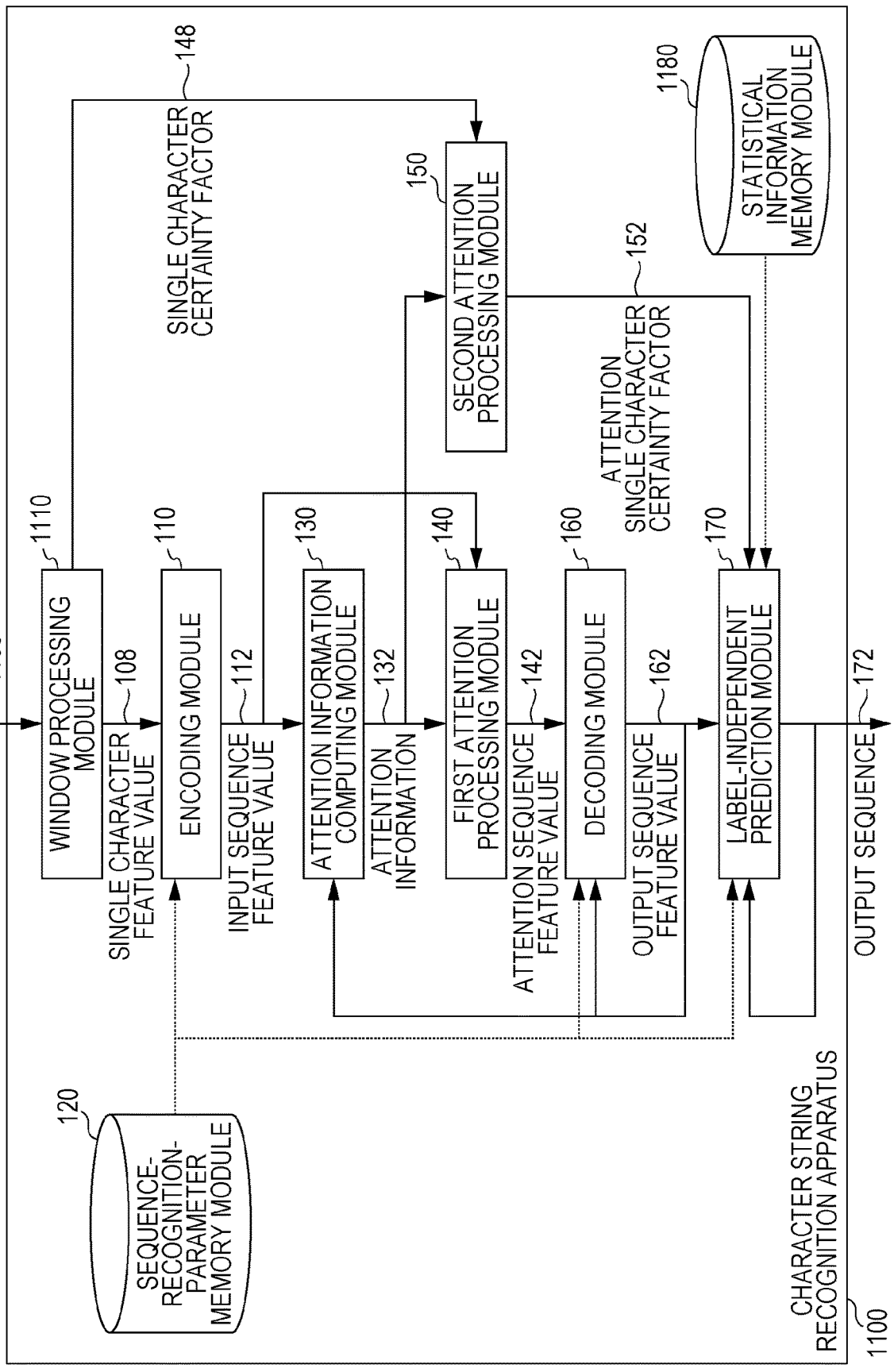
FIG. 11 illustrates a conceptual modular structure of a configuration of the exemplary embodiment.

Referring to FIG. 11, a character string recognition apparatus 1100 is configured by adding to the character string recognition apparatus 100 of FIG. 1 a window processing module 1110 and a statistical information memory module 1180.

The character string recognition apparatus 1100 includes the window processing module 1110, the encoding module 110, the sequence-recognition-parameter memory module 120, the attention information computing module 130, the first attention processing module 140, the second attention processing module 150, the decoding module 160, the level-independent prediction module 170, and the statistical information memory module 1180.

The character string recognition apparatus 1100 uses a single character recognition device (the window processing module 1110) that has been trained and statistical information (the statistical information memory module 1180).

The window processing module 1110 is connected to the encoding module 110, and the second attention processing module 150. The window processing module 1110 receives an image 1108, and transfers the single character feature value 108 to the encoding module 110 and transfers the single character certainty factor 148 to the second attention processing module 150.

The encoding module 110 is connected to the window processing module 1110, the sequence-recognition-parameter memory module 120, the attention information computing module 130, and the first attention processing module 140. The encoding module 110 receives the single character feature value 108 from the window processing module 1110, and transfers the input sequence feature value 112 to the attention information computing module 130.

The sequence-recognition-parameter memory module 120 is connected to the encoding module 110, the decoding module 160, and the level-independent prediction module 170.

The attention information computing module 130 is connected to the encoding module 110, the first attention processing module 140, the second attention processing module 150, and the decoding module 160. The attention information computing module 130 receives the input sequence feature value 112 from the encoding module 110, and transfers the attention information 132 to the first attention processing module 140 and the second attention processing module 150.

The first attention processing module 140 is connected to the encoding module 110, the attention information computing module 130, and the decoding module 160. The first attention processing module 140 receives the attention information 132 from the attention information computing module 130, and transfers the attention sequence feature value 142 to the decoding module 160.

The second attention processing module 150 is connected to the window processing module 1110, the attention information computing module 130, and the level-independent prediction module 170. The second attention processing module 150 receives the single character certainty factor 148 from the window processing module 1110, receives the attention information 132 from the attention information computing module 130, and transfers the attention single character certainty factor 152 to the level-independent prediction module 170.

The decoding module 160 is connected to the sequence-recognition-parameter memory module 120, the attention information computing module 130, the first attention processing module 140, and the level-independent prediction module 170. The decoding module 160 receives the attention sequence feature value 142 from the first attention processing module 140, and transfers the output sequence feature value 162 to the level-independent prediction module 170.

The level-independent prediction module 170 is connected to the sequence-recognition-parameter memory module 120, the second attention processing module 150, the decoding module 160, and the statistical information memory module 1180. The level-independent prediction module 170 receives the attention single character certainty factor 152 from the second attention processing module 150, receives the output sequence feature value 162 from the decoding module 160, and outputs the output sequence 172.

The statistical information memory module 1180 is connected to the level-independent prediction module 170.

Figure 12:
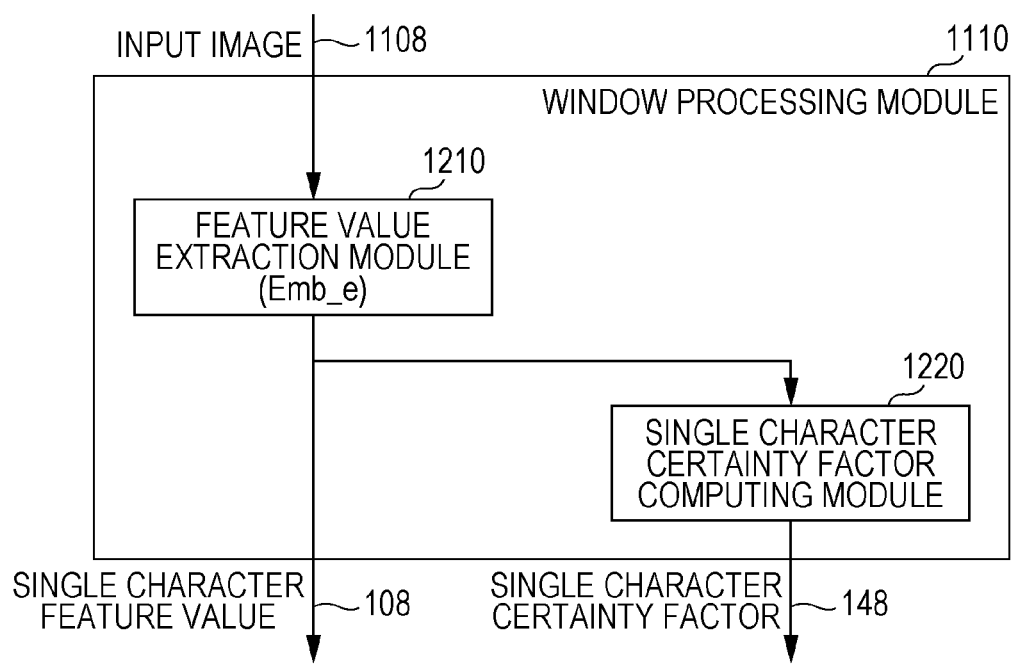
FIG. 12 illustrates a conceptual modular structure of a configuration of a window processing module.

A single character recognition device (the window processing module 1110) may generate a feature value of the input image 1108 to perform single character recognition. Specifically, as illustrated in FIG. 12, the single character recognition device computes the single character feature value 108 for the input image 1108 and further computes the single character certainty factor 148. (It will be noted that the single character certainty factor is typically computed by a neural network or a support vector machine).

The single character recognition device (the window processing module 1110) includes a feature value extraction module 1210 and a single character certainty factor computing module 1220. The feature value extraction module 1210 is connected to the single character certainty factor computing module 1220. The feature value extraction module 1210 receives the input image 1108 and outputs the single character feature value 108.

The single character certainty factor computing module 1220 is connected to the feature value extraction module 1210. The feature value extraction module 1210 outputs the single character certainty factor 148. The single character certainty factor computing module 1220 computes the single character certainty factor 148 from the single character feature value 108. The single character certainty factor computing module 1220 may include a convolutional neural network.

The character string recognition apparatus 1100 uses the single character feature value 108 and the single character certainty factor 148, both obtained from the window processing module 1110.

The following discussion focuses on the difference between the character string recognition apparatus 100 of FIG. 1 and the window processing module 1110.

The window processing module 1110 first computes the single character feature value 108 and the single character certainty factor 148 through the single character recognition device that has been trained. Specifically, the window processing module 1110 computes the single character feature value 108 and the single character certainty factor 148 for a partial image sequence that has been obtained by successively shifting a fixed size region in the direction of the character string on the input image 1108. If the single character recognition device is a neural network (see Masanori Sekino, Shunichi Kimura, and Yutaka Koshi, "Improvement of Convolutional Neural Network Character Recognition Based on Visual Information Processing Model" The Japanese Society for Artificial Intelligence (JSAI), 2013, and Donahue, Jeff, et al. "DeCAF: A deep convolutional activation feature for generic visual recognition," International Conference on Machine Learning, 2014), a feature value image obtained via a convolution process performed on the entire image is divided into partial regions instead of generating the partial image sequences in advance. This method is more efficient in terms of computation speed and computational complexity.

The level-independent prediction module 170 uses the immediately preceding label. The level-independent prediction module 170 further uses a non-character flag (an example of non-character information indicating a difference between a character and a non-character). The non-character indicates <bos> or <eos>. Whether the target is non-character or not is easily identified by using the non-character flag. In such a case, the feature value is computed in accordance with Equations 7:

$$z_k = \begin{cases} 0 & \text{if } k \text{ is non-character} \\ 1 & \text{otherwise} \end{cases}$$

$$b_{jk} = P(k \mid y_{j-1})$$

$$u_k = P(k)$$

$$f_{jk} = concat(c''_{jk}, \vec{s}_j, b_{jk}, u_k, z_k)$$

Equations 7 where $z_k$ is a non-character flag. $P(k|k')$ is an occurrence probability of a label k that is conditioned by a label k', $P(k)$ is a function corresponding to the occurrence probability of the label k, and is a value obtained via learning and contained in the statistical information.

The character string recognition apparatus 1100 includes the single character recognition device, and is thus free from computing the single character feature value 108 in advance. Since the character string recognition apparatus 1100 uses the non-character flag and the statistical information in the statistical information memory module 1180, and thus performs character recognition at a higher accuracy level.

In a job, such as a data entry job, a user may check the output sequence 172 output by the character string recognition apparatus 100 or the character string recognition apparatus 1100. A display module thus displays the output sequence 172. In such a case, if the display module displays the output sequence 172 in association with the input image 1108, a character string serving as a check target is comparable with the output sequence 172 serving as recognition results. The user may more easily diagnose the presence or absence of an error in the output sequence 172.

The display module may display not only the output sequence 172 but also the attention information 132 and the attention single character certainty factor 152 in a manner such that the attention information 132 and the attention single character certainty factor 152 are associated with each character in the output sequence 172. The display module may display screens as illustrated in FIGS. 13A through 13E and FIGS. 14A through 14D.

A visualization example that is useful in analyzing the character recognition results (the output sequence 172) using the attention single character certainty factor 152 is described below. The data entry job includes analyzing the character recognition results and detecting and correcting an error if the error is detected in the character recognition results. Referring to FIGS. 13A through 13E and FIGS. 14A through 14D, more efficient analysis may be performed by referring to the attention information and the attention single character certainty factor in addition to the input image and the output sequence. The output certainty factor may also be additionally displayed. The output certainty factor is $e_{jk}$ in Equation 6 or normalized $e_{jk}$.

Figure 13:
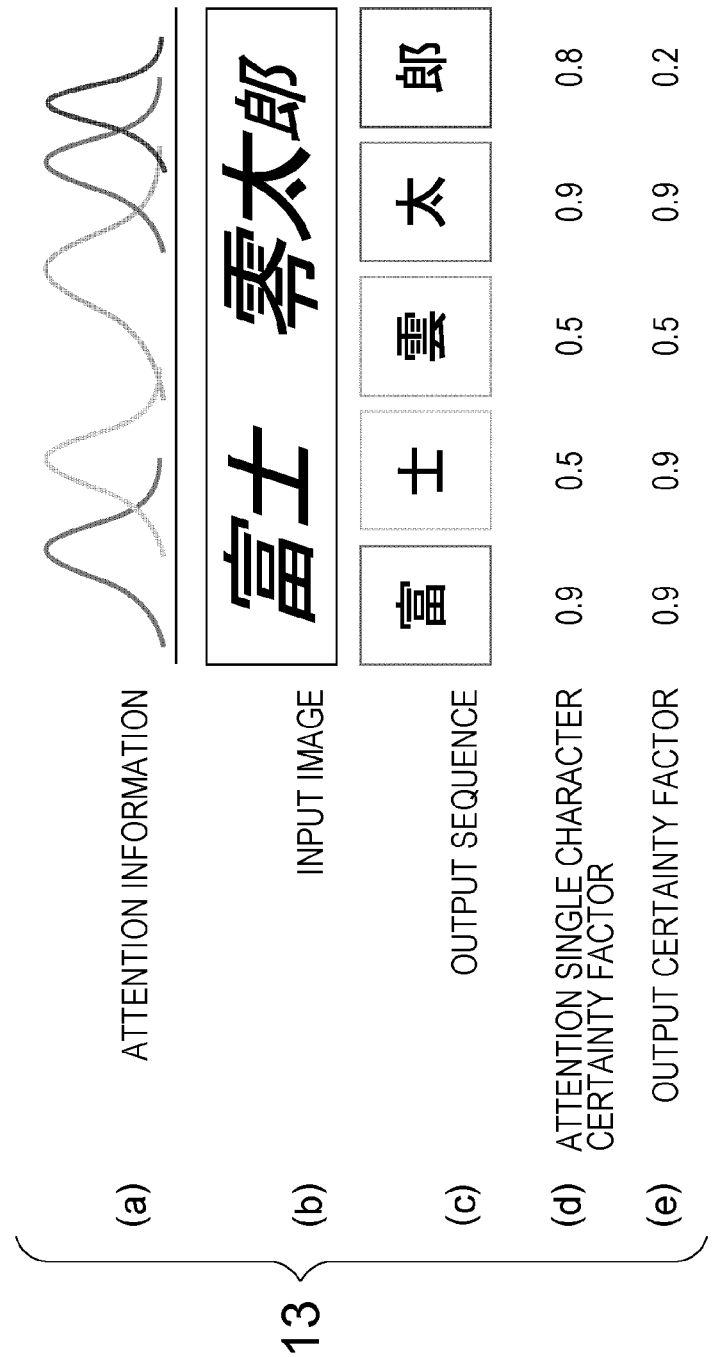
FIG. 13 illustrates an example of a display of results of a character string recognition process.

FIG. 13 illustrates (a) attention information, (b) input image, (c) output sequence, (d) attention single character certainty factor, and (e) output certainty factor from top to bottom on a per label basis. The attention information is displayed in graph as illustrated in FIG. 8. FIG. 13 illustrates these pieces of information in color different from label to label in an easy-to-understand way. For example, the graph of the attention information on the left end and "富" as the output sequence on the left end are displayed in the same color, for example, in red. Furthermore, the attention single character certainty factor on the left end and the output certainty factor on the left end may be displayed in the same color, for example, in red.

The attention information may enable the operator to determine which label corresponds to which location of the input image. The attention single character certainty factor represents a certainty factor of a single character while the output certainty factor is a certainty factor of recognition that accounts for the context of the character sequence. The operator may analyze recognition results at different angles by referring to this difference.

Figure 14:
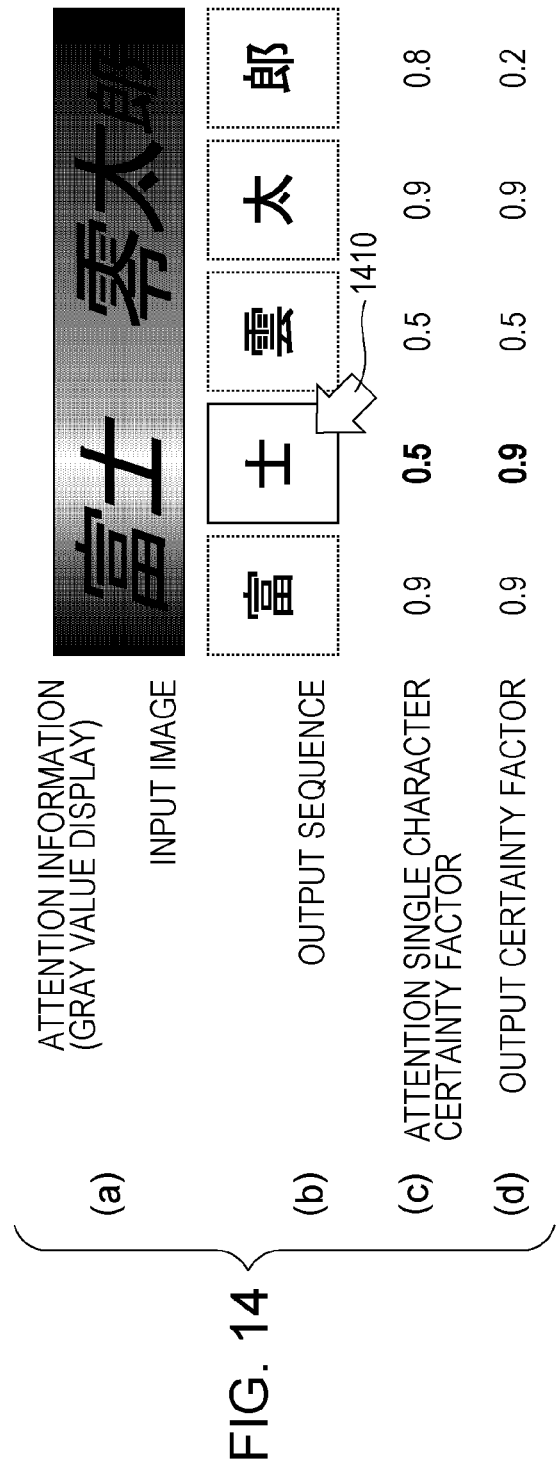
FIG. 14 illustrates an example of a display of results of the character string recognition process.

FIG. 14 illustrates (a) attention information on the input image, (b) input image, (c) attention single character certainty factor, (d) output certainty factor from top to bottom on a per label basis. The attention information is displayed in different gray values on the input image. Only a portion of the screen selected by the operator may be emphasized. Referring to FIG. 14, the frame of the output sequence surrounding "±" at the location where a mouse cursor 1410 is placed is defined by solid line (while other output sequences are defined by broken line), the attention information is displayed in different gray values on the input image (the corresponding portion is displayed in white), and the corresponding attention single certainty factor and output certainty factor are displayed in bold face.

A hardware configuration of a computer on which programs as the exemplary embodiment run is a standard computer as illustrated in FIG. 15. Specifically, the computer hardware configuration is a computer that may serve as a personal computer or a server. Specifically, a central processing unit (CPU) 1501 is used as a processor (arithmetic processor), and a random-access memory (RAM) 1502, a read-only memory (ROM) 1503, and a hard disk drive (HDD) 1504 are used as storage devices. A hard disk drive, or a solid state drive (SSD), such as a flash memory, may be used for the HDD 1504. The computer includes the CPU 1501 that executes the program of the encoding module 110, the attention information computing module 130, the first attention processing module 140, the second attention processing module 150, the decoding module 160, the level-independent prediction module 170, the window processing module 1110, and the like, the RAM 1502 that stores the program and data, the ROM 1503 that stores the program that starts up the computer, the HDD 1504 that is an auxiliary storage device having the functions of the sequence-recognition-parameter memory module 120, the statistical information memory module 1180, and the like. The computer further includes a reception device 1506 that receives data responsive to an operation (such as an action, voice, eye gaze of the user) that the user performs on a keyboard, a mouse, a touch screen, a microphone, a camera (including an eye gaze detection camera), an output device 1505, such as a cathode ray tube (CRT), a liquid-crystal display and/or a speaker, a communication network interface 1507, such as a network interface card, for connection with a communication network, and a bus 1508 that interconnects these elements to exchange data thereamong. Multiple computers of this type may be interconnected to each other via a network.

A computer program of the exemplary embodiment may be read as software onto the system of the hardware configuration, and the exemplary embodiment is thus implemented with the software and hardware resources operating in cooperation.

The hardware configuration of FIG. 15 indicates a configuration example only. The disclosure is not limited to this hardware configuration of FIG. 15 and may be acceptable in any form as long as the modules of the exemplary embodiment are implemented. For example, a subpart of the modules may be implemented using an application specific integrated circuit (ASIC) or a reprogrammable integrated circuit, such as a field-programmable gate array (FGA). In another example, the subpart of the modules may be in an external system and connected to the system of FIG. 15 via a communication network. In yet another example, plural systems of FIG. 15 may be interconnected to each other via a communication network such that the systems operate in cooperation with each other. One of the modules may be incorporated not only in a personal computer, but also in a robot, a copying machine, a facsimile device, a scanner, a printer, and a multifunction apparatus (for example, an image processing apparatus having at least two of the functions of the scanner, the printer, the copying machine, and the facsimile device).

According to the exemplary embodiment, the character string image is a recognition target. A character string stroke may be a target in online character recognition. Specifically, a partial image of an input image containing a written character string may be a target as a partial pattern of an input pattern. A partial pattern of a hand-written input pattern may be a target as a partial pattern of an input pattern.

The above-described program may be supplied in a stored state on a recording medium. The program may also be provided via communications. In such a case, the above-described program may be understood as the disclosure of a "non-transitory computer readable recording medium storing the program".

The "non-transitory computer readable recording medium storing the program" refers to a computer readable recording medium storing the program, and is used to install the program, to execute the program, or to distribute the program.

The recording media include digital versatile disk (DVD), compact disk (CD), Blu-ray (registered trademark) disc, magnetooptical (MO) disk, flexible (FD) disk, magnetic tape, hard disk, read-only memory (ROM), electronically erasable and programmable read-only memory (EEPROM (registered trademark)), flash memory, random-access memory (RAM), and secure digital (SD) memory card. The DVDs include "DVD-R, DVD-RW, and DVD-RAM" complying with standards formulated by the DVD forum, and "DVD+R and DVD+RW" complying with standards formulated by DVD+RW. The CDs include read-only CD (CD-ROM), recordable CD-R, and rewritable CD-RW.

The program in whole or in part may be stored on the recording medium for storage and distribution. The program in whole or in part may be transmitted via a transfer medium. The transfer media include a wired network, a wireless network, or a combination thereof. The wired and wireless networks may include a local-area network (LAN), a metropolitan-area network (MAN), a wide-area network (WAN), the Internet, an intranet, and/or an extranet. The program in whole or in part may be transmitted over a carrier wave transmitted via the transfer media.

The program may be part or whole of another program, or may be stored on the recording medium together with another program. The program may be split and split programs may then be separately stored on the respective recording media. The program may be processed in any fashion before being stored as long as the program remains restorable. For example, the program may be compressed or encrypted before storage.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A character string recognition apparatus comprising
a memory, storing a program; and
a processor, executing the program stored in the memory to be configured to:
receiving an input image;
computing a single character certainty factor and a single character feature value from the received input image through a trained single character recognition device;
compute an attention information from the received input image by encoding and computing the single character feature value through a recurrent neural network,
output recognized labels from an image of a character string on the received input image,
compute an attention single character certainty factor for each of the recognized labels from the single character certainty factor and the attention information.

2. The character string recognition apparatus according to claim 1, wherein a non-character value is added to the attention single character certainty factor, and non-character information indicating a non-character is added to a feature value used by the processor, wherein the non-character information indicates that from among the feature values, a feature value that quotes an attention certainty factor for the non-character is the non-character.

3. The character string recognition apparatus according to claim 1, wherein a sequence of single character feature values computed for a partial pattern of an input pattern from the received input image serves as an input to the recurrent neural network.

4. The character string recognition apparatus according to claim 2, wherein a sequence of single character feature values computed for a partial pattern of an input pattern from the received input image serves as an input to the recurrent neural network.

5. The character string recognition apparatus according to claim 3, wherein the single character recognition device computes the attention single character certainty factor from the single character feature value.

6. The character string recognition apparatus according to claim 4, wherein the single character recognition device computes the attention single character certainty factor from the single character feature value.

7. The character string recognition apparatus according to claim 5, wherein the single character recognition device is a convolutional neural network.

8. The character string recognition apparatus according to claim 6, wherein the single character recognition device is a convolutional neural network.

9. The character string recognition apparatus according to claim 1, further comprising
a display that displays an indication that is used to confirm recognition results, wherein the display displays the attention information or the attention single character certainty factor.

10. The character string recognition apparatus according to claim 2, further comprising
a display that displays an indication that is used to confirm recognition results, wherein the display displays the attention information or the attention single character certainty factor.

11. The character string recognition apparatus according to claim 3, further comprising
a display that displays an indication that is used to confirm recognition results, wherein the display displays the attention information or the attention single character certainty factor.

12. The character string recognition apparatus according to claim 4, further comprising
a display that displays an indication that is used to confirm recognition results, wherein the display displays the attention information or the attention single character certainty factor.

13. The character string recognition apparatus according to claim 5, further comprising
a display that displays an indication that is used to confirm recognition results, wherein the display displays the attention information or the attention single character certainty factor.

14. The character string recognition apparatus according to claim 6, further comprising
a display that displays an indication that is used to confirm recognition results, wherein the display displays the attention information or the attention single character certainty factor.

15. The character string recognition apparatus according to claim 7, further comprising
a display that displays an indication that is used to confirm recognition results, wherein the display displays the attention information or the attention single character certainty factor.

16. The character string recognition apparatus according to claim 8, further comprising
a display that displays an indication that is used to confirm recognition results, wherein the display displays the attention information or the attention single character certainty factor.

17. The character string recognition apparatus according to claim 3, wherein the partial pattern of the input pattern is a partial image of the received input image including a character string written thereon.

18. The character string recognition apparatus according to claim 3, wherein the partial pattern of the input pattern is a partial pattern of a hand-written input pattern on the received input image.

19. A non-transitory computer readable medium storing a program causing a computer to execute a process for recognizing a character string, the process comprising:
receiving an input image;
computing a single character certainty factor and a single character feature value from the received through a trained single character recognition device;
computing an attention information from received input image by encoding and computing the single character feature value through a recurrent neural network;
outputting recognized labels from an image of a character string on the input image; and
computing an attention single character certainty factor for each of the recognized labels from the single character certainty factor, wherein the single character certainty factor.

20. The character string recognition apparatus according to claim 1, wherein the processor is further configured to
share a parameter among the labels by generating from the attention single character certainty factor of each label.

* * * * *